W. SPARKS.
BALL RETAINER FOR BALL BEARINGS.
APPLICATION FILED AUG. 26, 1911.
1,080,082.
Patented Dec. 2, 1913.
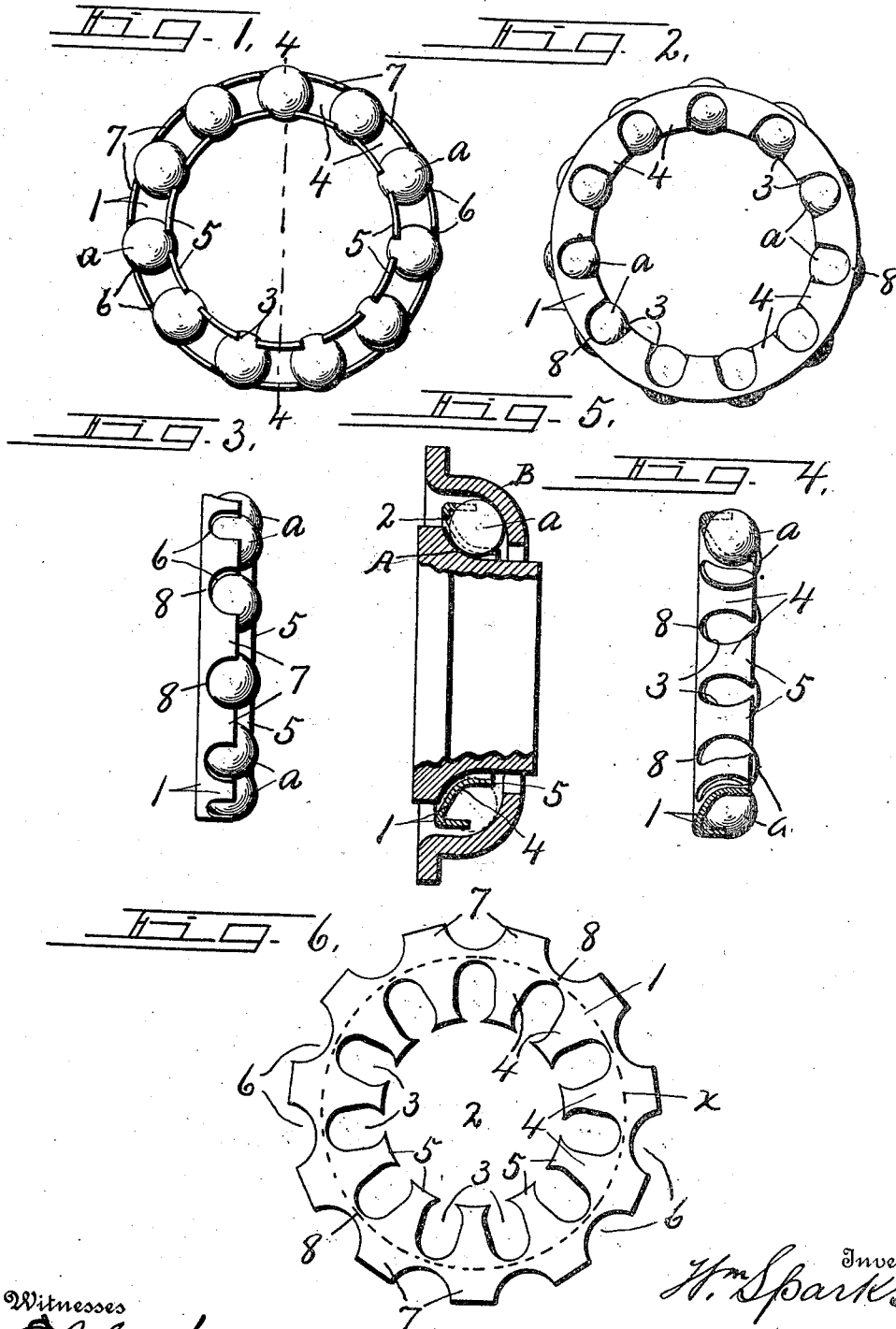
Witnesses
E. J. Staub
H. E. Chase
Inventor
Wm. Sparks
By Howard P. Denison
Attorney

UNITED STATES PATENT OFFICE.

WILLIAM SPARKS, OF JACKSON, MICHIGAN, ASSIGNOR TO THE SPARKS-WITHINGTON COMPANY, OF JACKSON, MICHIGAN, A CORPORATION OF MICHIGAN.

BALL-RETAINER FOR BALL-BEARINGS.

1,080,082.  Specification of Letters Patent.  Patented Dec. 2, 1913.

Application filed August 26, 1911. Serial No. 646,207.

*To all whom it may concern:*

Be it known that I, WILLIAM SPARKS, of Jackson, in the county of Jackson, in the State of Michigan, have invented new and useful Improvements in Ball-Retainers for Ball-Bearings, of which the following, taken in connection with the accompanying drawings, is a full, clear, and exact description This invention relates to certain improvements in ball retainers for ball bearings somewhat similar to that set forth in my copending application, Serial Number 646206 filed Aug. 26, 1911 except that instead of bridging across the inner ends of the ball openings by connecting webs to form a continuous annular flange, these portions are cut away or left open, thereby producing a sheet metal blank having one set of inwardly projecting radial arms and another set of outwardly projecting radial arms, the latter being separated by recesses in the periphery of the blank in radial alinement with the ball openings for receiving portions of the balls when the inner and outer marginal edges of the blank are bent in the same direction parallel with the axis to retain the balls in spaced relation uniform distances apart circumferentially and also against axial displacement from the retainer.

The main object is to make a ball retainer with the least amount of stock and labor possible so as to reduce the weight and cost of manufacture to a minimum and still provide for the spacing and retention of the balls with a minimum degree of friction.

Other objects and uses will be brought out in the following description.

In the drawings—Figures 1, 2 and 3 are respectively opposite face views and an edge view of my improved ball retainer with the balls therein. Fig. 4 is a transverse sectional view of the same retainer taken on line 4—4 Fig. 1. Fig. 5 is a sectional view, partly in elevation, of a journal bearing and my improved ball retainer therein. Fig. 6 is a plan of the flat sheet metal blank before bending but cut for forming the retaining arms and ball openings.

This retainer is preferably made from a single piece of thin sheet steel or other suitable metal and is first cut in the form of a flat plate or blank —1— shown in Fig. 6 as provided with a central substantially circular opening —2—, the inner margin being provided with a series of radially elongated ball openings —3— communicating with the central opening —2—, leaving a corresponding number of inwardly projecting radial arms —4— of substantially the same form and size, the inner ends of the openings —3— being contracted to form flaring inner terminal ends —5— on the arms —4—. The outer margin of the blank is provided with a series of substantially semi-circular recesses —6— of uniform size and spaced equi-distant apart circumferentially leaving intervening outwardly projecting radial arms —7—, said recesses being alined radially with the ball openings —3— and are spaced apart therefrom by intervening webs —8— forming tie pieces or connections between adjacent radial arms. The circumferential widths of the recesses —6— are somewhat greater than that of the corresponding ball openings —3— or of such width that when the arms —4— and —7— are bent in the same direction parallel with each other and with the axis of the retainer in a manner hereinafter described, they will be of substantially the same width as their corresponding ball openings —3— or slightly less than the diameter of the balls as —a— which they are adapted to receive. After the blank is cut in the manner described, the arms —7— and adjacent portions of the connecting webs —8— are bent in the same direction, by pressing or otherwise, on a circular line —X— at substantially right angles to the plane of the main body, while the flaring ends —5— of the arms —4— are bent in the same direction and parallel with the overturned arms —7—, the remaining portions of the arms —4— being deflected in the same direction so as to form an acute angle with the arms —7— and an obtuse angle with the flaring ends —4— as best seen in Figs. 4 and 5.

The object in deflecting the portions of the arms —4— between the flaring extensions —5— and connecting webs —8— in the manner described is to project said extensions —5— some distance beyond the plane of the corresponding ends of the arms —7— and to allow the balls to protrude inwardly through the openings —3— beyond the plane of the deflected portions of the arms —4— or diagonally opposite the openings between the edges of the arms —4— and —7—, thereby allowing the inner and outer surfaces of the balls to rest against suitable inner and outer bearings as a cone —A— and a cup —B— Fig. 5. This latter result of allowing the balls to protrude inwardly and outwardly beyond the arms —4— and —7— is also brought about by making the distances between the inner and outer sets of arms less than the diameter of the balls, while the openings —3— and recesses —6— when the arms are bent in the manner described are of slightly less width than the diameter of the balls, thereby causing the edges of the arms —4— and —7— to hold the balls from passing inwardly or outwardly through the openings or recesses. The flaring ends —5— of the arms —4— therefore extend axially of the retainer some distance beyond the centers of the balls and serve to hold said balls against displacement axially of said retainer through the openings between the arms by reason of the fact that the space or opening between the inner ends of the flaring extensions is less than the diameter of the spherical segment of the balls at the planes of the arms —4—. The balls are additionally held in place by reason of the fact that the distance from each point of the flaring extension —5— at one side of the adjacent opening to the diagonally opposite point of the next adjacent arm —7— of the same opening is less than the diameter of the ball in said opening, thereby preventing outward displacement of the balls from their respective openings —3—. The main feature of the invention therefore lies in providing the retainer with inner and outer marginal arms spaced uniform distances apart less than the diameters of the balls which such spaces are adapted to receive and bending said arms in the same direction parallel with each other and with the axis of the retainer so as to engage the balls at the inner and outer sides of their centers, the inner set of arms being extended beyond the ends of the arms of the outer set and flared circumferentially to hold the balls against displacement through the open side of the retainer. The ball retainer therefore consists of a sheet metal ring having inner and outer axially projecting flanges spaced apart, the inner flange being provided with a series of ball openings and intervening arms having circumferentially flaring ends, while the outer flange is provided with a series of recesses of less circumferential width than the diameter of the balls, and retaining arms for said balls.

What I claim is:

A ball retainer comprising a sheet metal ring having an inner circular series of relatively long axially extending arms having their ends flaring circumferentially, and an outer circular series of relatively short arms extending axially in the same direction as the long arms and gradually decreasing in circumferential width toward their ends, the arms of each series being spaced apart to form intervening ball openings, the openings between the inner arms being of considerably greater length than those between the outer arms in the direction of length of said arms.

In witness whereof I have hereunto set my hand on this twenty first day of August 1911.

WILLIAM SPARKS.

Witnesses:
 H. E. CHASE,
 HOWARD P. DENISON.